United States Patent [19]

Sivachenko

[11] 4,346,576
[45] Aug. 31, 1982

[54] APPARATUS FOR SEVERING CORRUGATED METAL PRODUCTS

[76] Inventor: Eugene W. Sivachenko, 6471 Riverside Dr., Redding, Calif. 96001

[21] Appl. No.: 167,942

[22] Filed: Jul. 14, 1980

Related U.S. Application Data

[63] Continuation of Ser. No. 932,253, Aug. 9, 1978, abandoned.

[51] Int. Cl.³ ............................................... B21C 37/12
[52] U.S. Cl. .......................................... 72/49; 72/176; 72/186; 72/336
[58] Field of Search ............................ 72/49, 176–183, 72/186, 336; 225/1, 96; 29/DIG. 33; 83/326, 318–320

[56] References Cited

U.S. PATENT DOCUMENTS

| | | | |
|---|---|---|---|
| 2,444,465 | 7/1948 | Peters | 29/413 |
| 3,367,161 | 2/1968 | Avakian | 72/186 |
| 3,677,046 | 7/1972 | Carroll | 72/49 |
| 3,807,261 | 4/1974 | Courreur | 83/326 X |
| 4,096,720 | 6/1978 | Anderson et al. | 72/50 |

FOREIGN PATENT DOCUMENTS

743599  1/1956  United Kingdom ................. 225/96

*Primary Examiner*—Leon Gilden

[57] ABSTRACT

A method and apparatus is described for use in combination with a machine for corrugating a continuous strip of flat sheet material which prepares the sheet material for separation into sections after it has been corrugated. A platform is located upstream of the corrugating machine. The platform is intermittently advanced in the direction of travel and at the speed of the sheet material so that the platform is stationary relative to the sheet material. A scoring device is located on the platform. The scoring device moves across the width of the sheet material as the platform moves with the sheet material to form a spanwise weak point in the material. After the material passes through the corrugating machine, it can readily be separated into sections at the weak points formed in the material by the scoring device. Depth of scoring can be varied also so that substantial/total separation can also occur within the corrugator though it would not separate the flat strip before it entered the corrugator.

29 Claims, 19 Drawing Figures

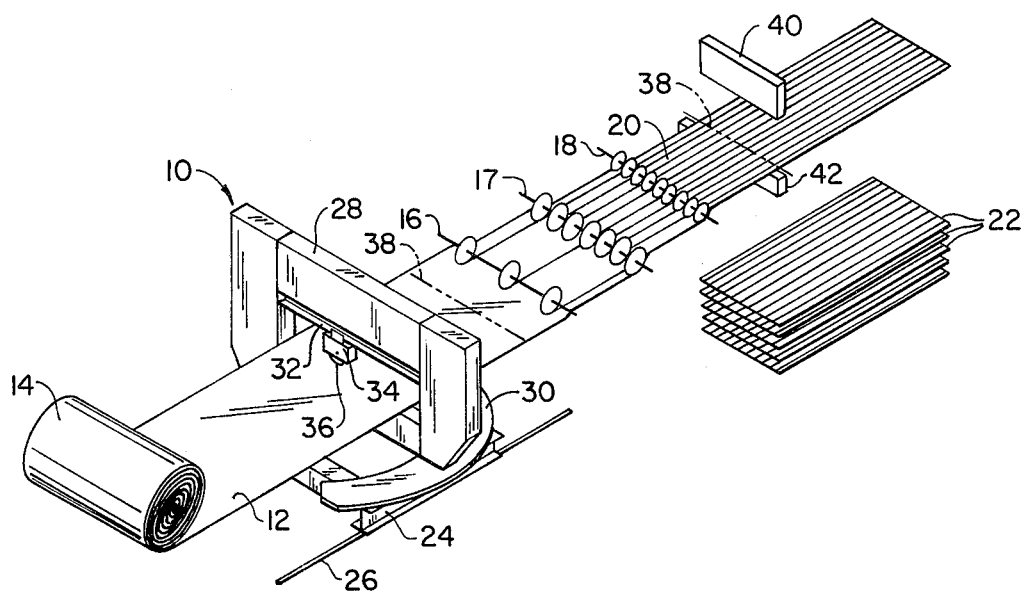
FIG._1.
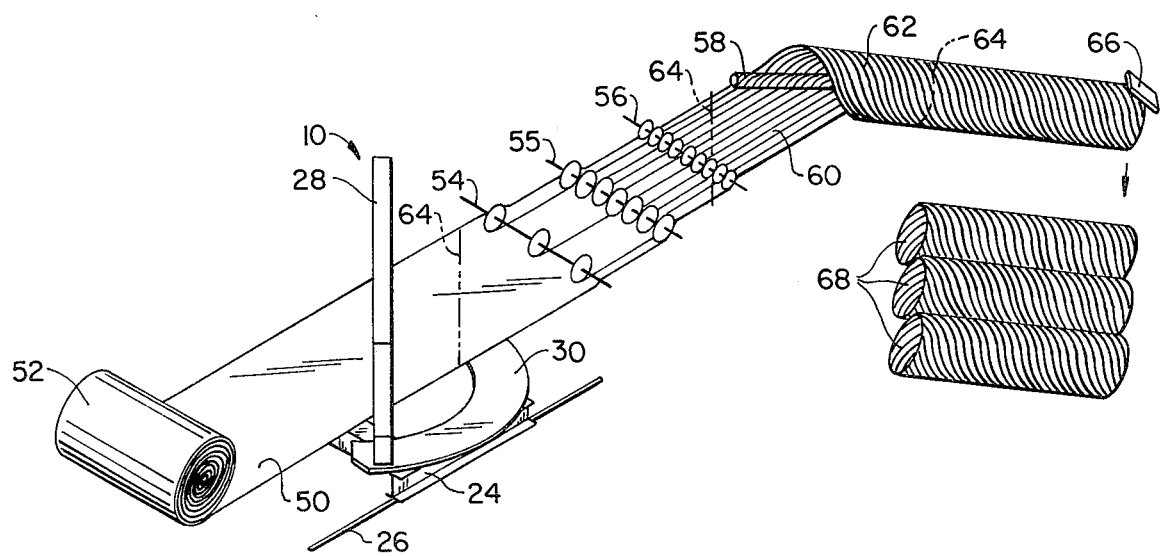
FIG._2.

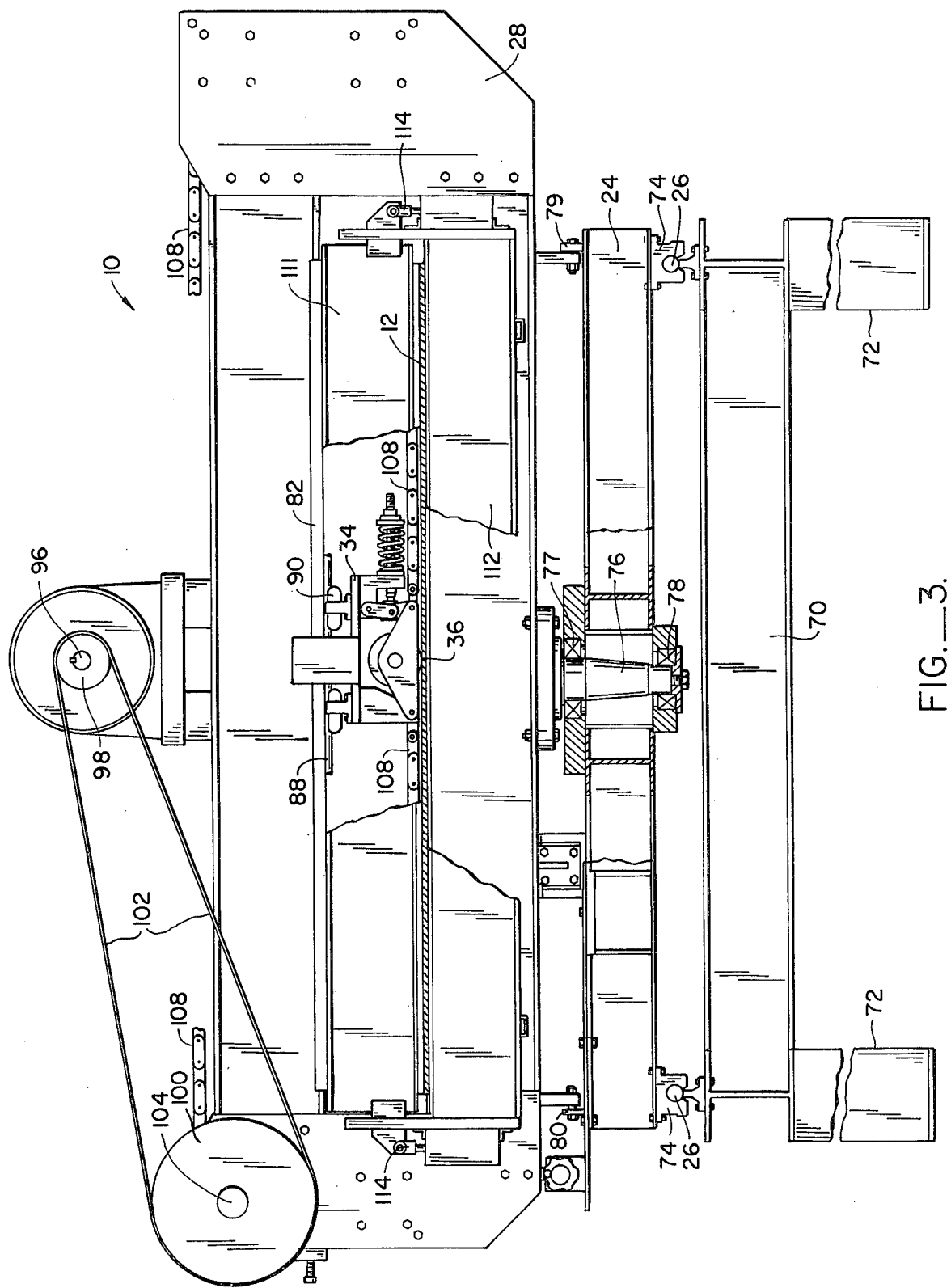
FIG._3.

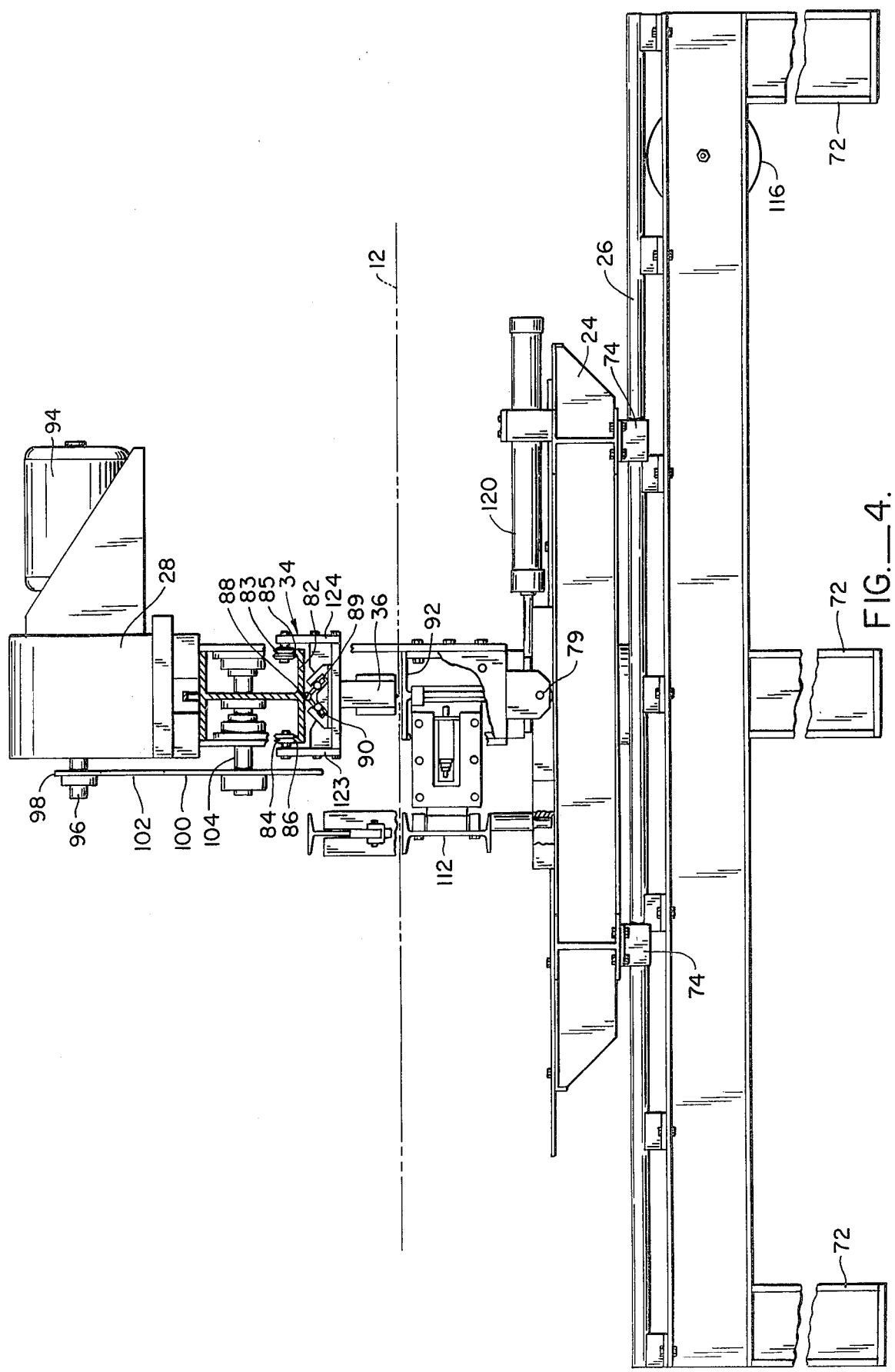

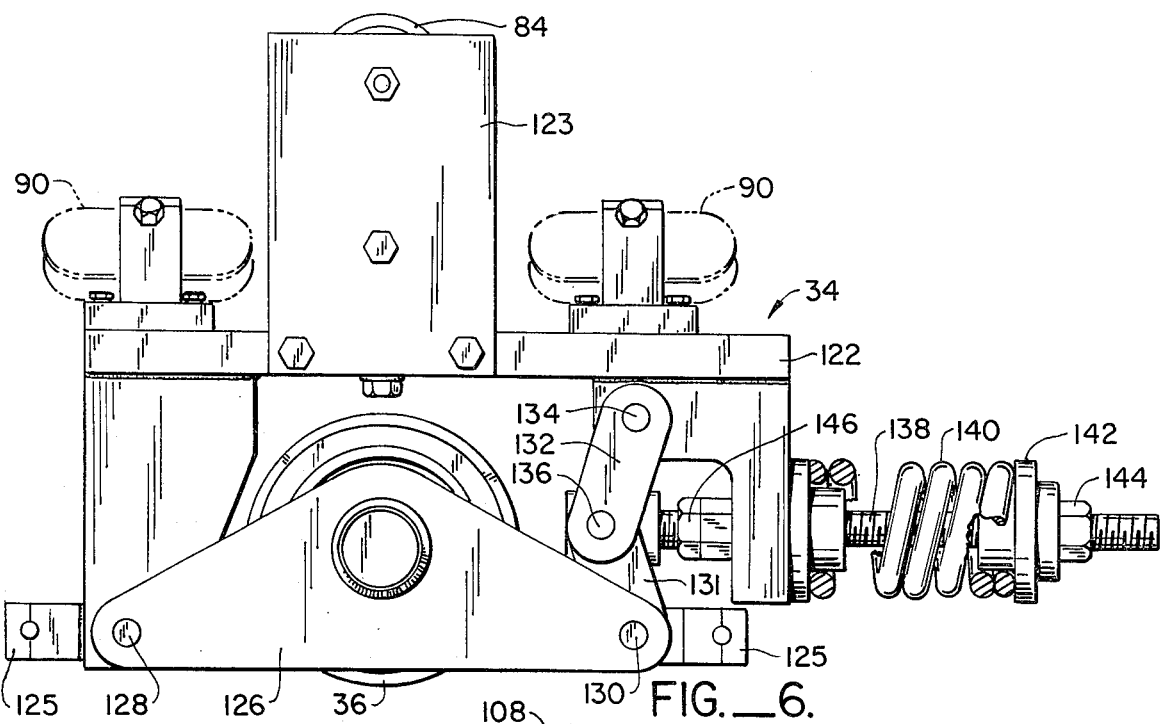
FIG._6.
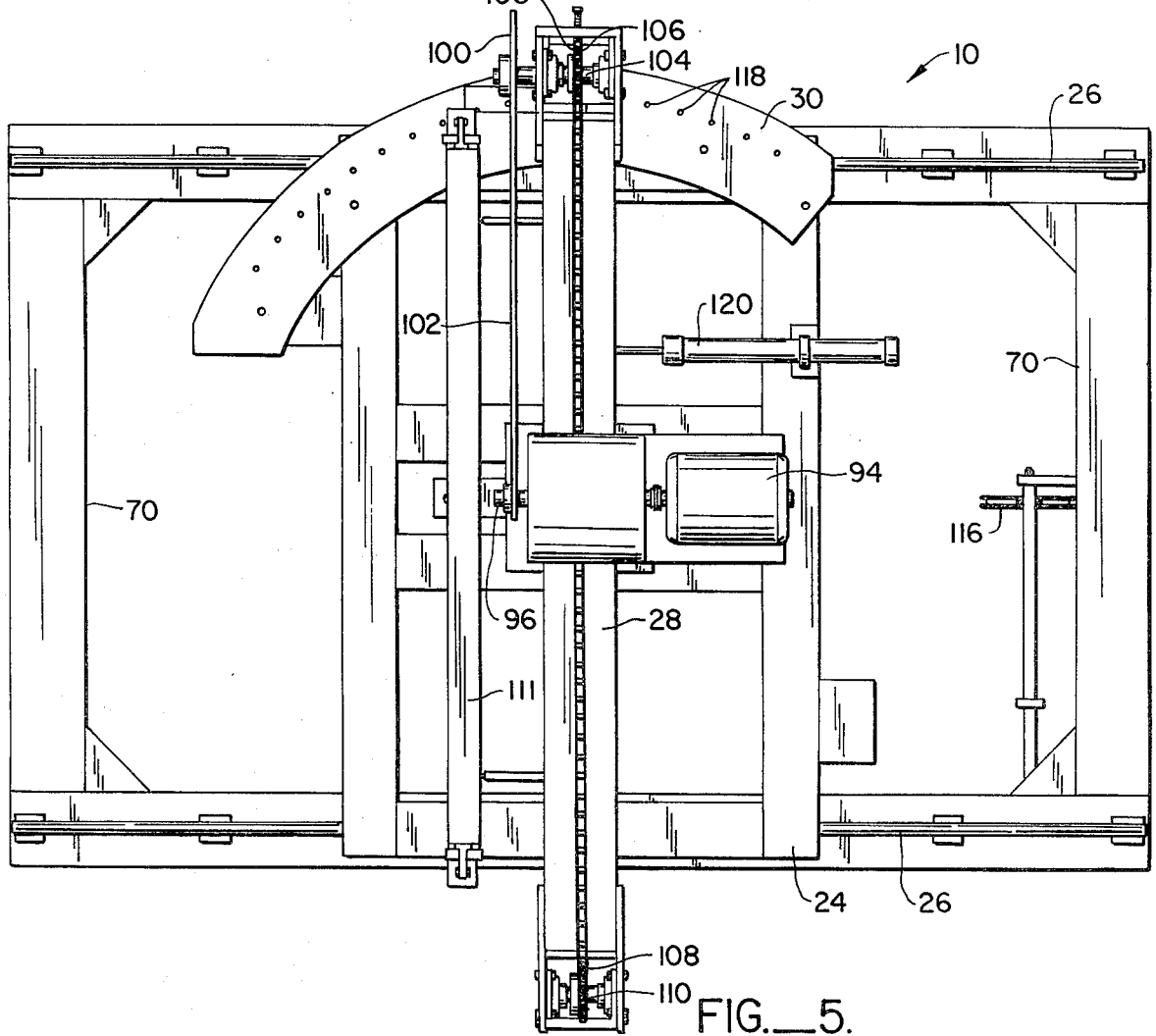
FIG._5.

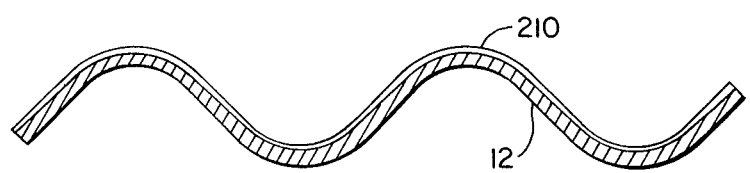
FIG._10.
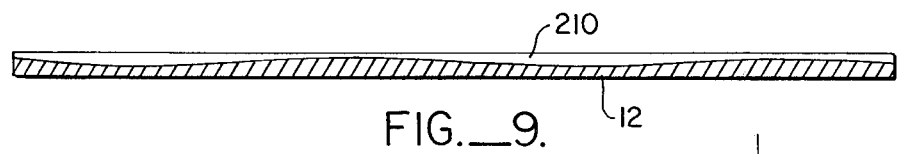
FIG._9.
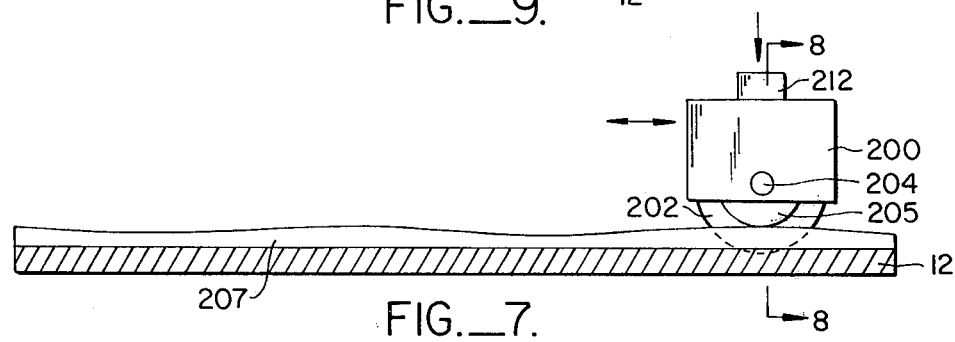
FIG._7.
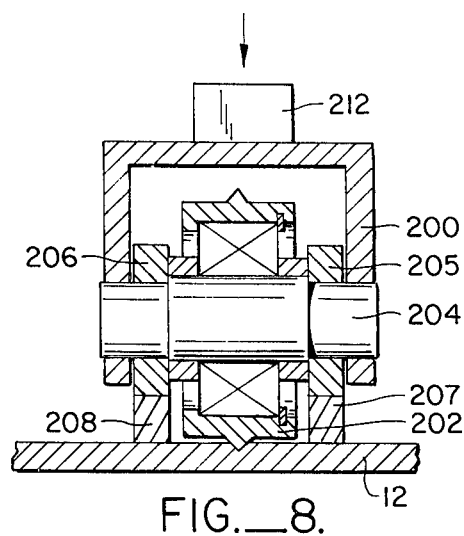
FIG._8.

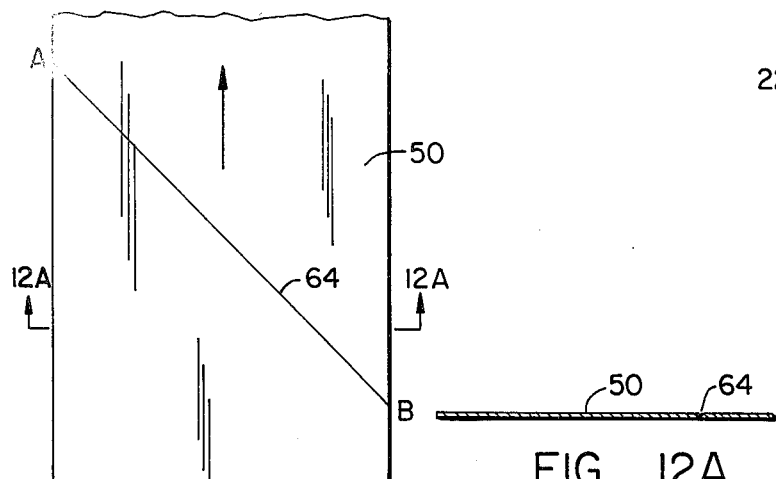
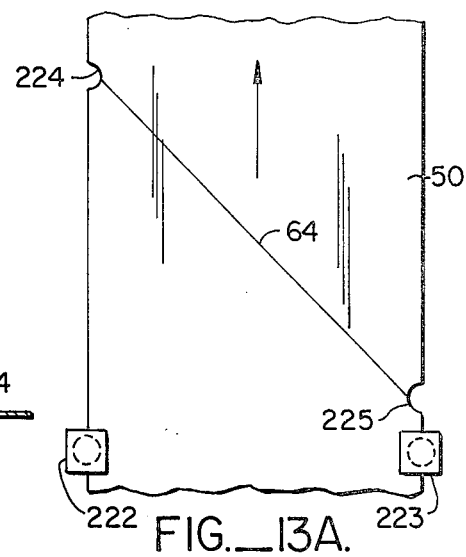
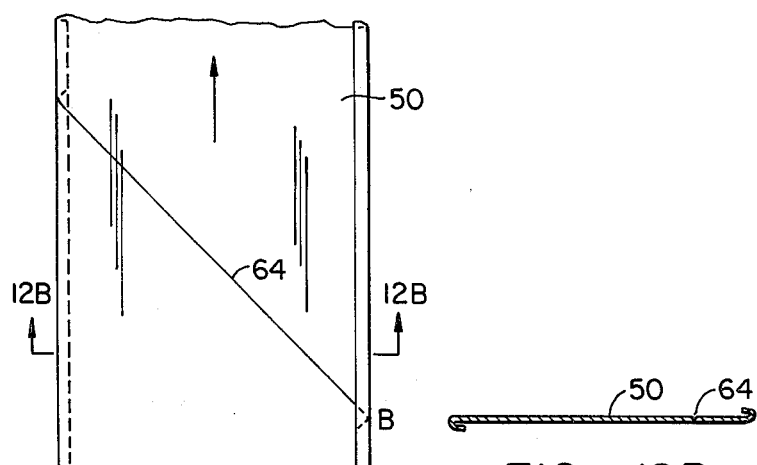
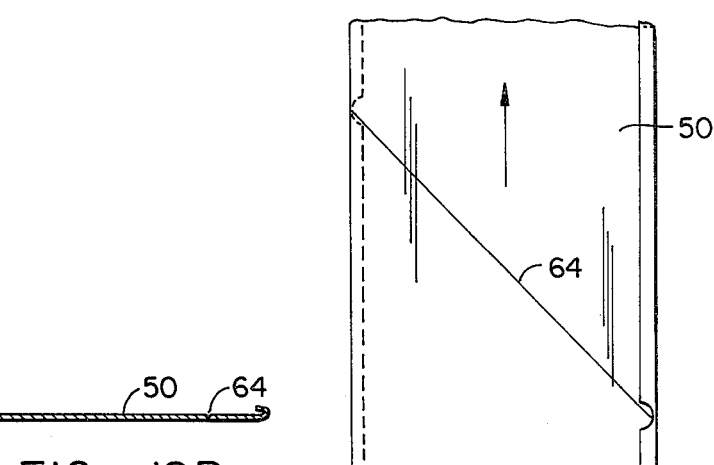
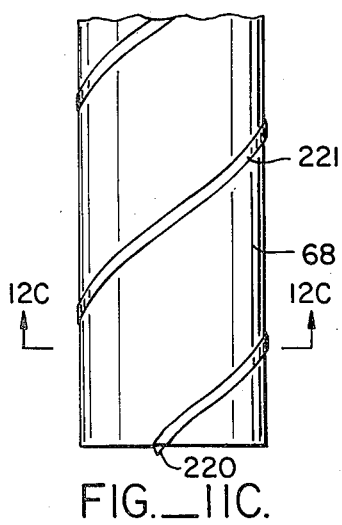
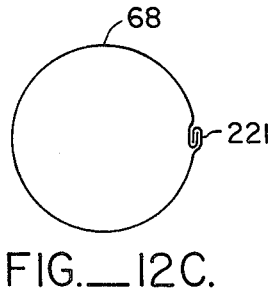
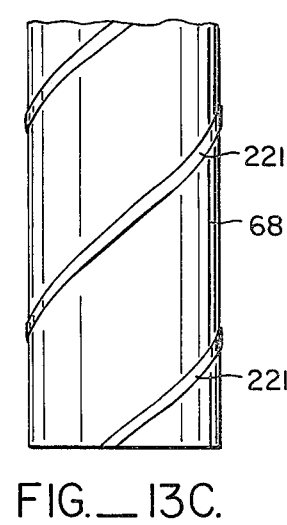

APPARATUS FOR SEVERING CORRUGATED METAL PRODUCTS

This is a continuation of application Ser. No. 932,253, filed Aug. 9, 1978 and now abandoned.

BACKGROUND OF THE INVENTION

The present invention relates to systems for separating a continuous strip of corrugated material into sections, and in particular to preparing the flat sheet material prior to corrugation to facilitate separation of the material into sections after it has been corrugated and/or during the corrugating process.

The use of corrugated structural material, particularly steel, has become quite popular relatively recently in two distinct applications. First, relatively thin gauge sheet material can be corrugated to provide the material with resistance to bending, and used as building panels in various construction applications. Second, a strip of flat sheet material can be corrugated and wound in a helical fashion to form corrugated pipe.

In the formation of corrugating building panels and in the formation of helically wound corrugated pipe, a roll of flat sheet stock is typically used. The flat sheet stock is fed from the roll into a corrugating machine, which forms the flat sheet stock into a continuous strip of corrugated material. In the formation of helically wound corrugated pipe, the strip of corrugated material is wound into the shape of the pipe and the edges are welded or mechanically locked together as with a Pittsburgh lock to form a continuous pipe. These procedures are quite streamlined and efficient, but unfortunately, the efficiency breaks down at the point when the strip of corrugated material is to be separated in the discrete building panels, or the continuous pipe is to be separated into discrete pipe sections.

When building panels are formed in the above described fashion, a continuous strip of corrugated material having a two dimensional profile emanates from the corrugating machine. It is desired that the two dimensional profile be quite deep, and that a substantial portion of the material be located at the extremities of the profile, using steep walls between the extremities, to maximize the bending resistance of the panels.

Shear blades are typically located downstream of the corrugating machine to separate the corrugated material into discrete building panels. For shallow profiles, corresponding shear blades with shallow corrugated edges provide an acceptable cutting tool. However, when the material is to be cut at an angle, such as to accommodate eaves, new shear blades must be provided with a different contour. Each time the contour of the materials change, or the cutting angle is changed, the shear blades must be changed as well. As a result, shearing the material becomes a complex and expensive process, and substantially increases the cost of the entire operation.

To shear building panels with shallow corrugated profiles, it is customary to provide shear blades in which one of the blades is inclined from horizontal so that the material is cut from one side to the other in a "scissors" fashion. However, this type of shearing interrupts the continuity of the forming process, which is a particular problem in high speed operations. Moreover, when panels are to be sheared which have deep profiles, and connecting sides at steep angles, it is necessary to use parallel shear blades which instantaneously shear the panel across its entire width. Unfortunately, instantaneous shearing of the entire panel requires massive equipment which is extremely expensive, especially when multiple sets of shear blades must be available.

An obvious solution to the above difficulties would be to cut the sheet stock into sections before it enters the corrugating machine (which requires long runout tables resulting in using more floor space). However, this is generally undesirable because it interrupts the forming operation and reduces the speed of the operation. Also, the quality of the corrugations is diminished at the ends of the corrugated segments because such ends are not restrained as they pass through the corrugating machine, as is the case when a continuous strip of sheet material is being corrugated.

Separating the helically wound continuous corrugated pipe into sections is even more complex. A saw is generally provided on a moving carriage where speed must be precisely matched with the speed of the pipe (see U.S. Pat. Nos. 3,198,043; 3,257,881; 3,369,432). Equipment for sawing the pipe is quite expensive, requires frequent maintenance, and is also noisy. The sawing operation forms an extremely sharp and dangerous edge on the pipe, and it is not uncommon for such pipe to be rejected because of its hazardous edges. The saw also forms burrs on the edge of the pipe, and an additional grinding step must be added, usually at the cost of much hand labor, to remove these burrs and the sharp edge from the end of the pipe.

In the manufacturing of small items, much smaller than the building panels and pipes discussed above, the technique of scoring the material prior to forming to facilitate subsequent sectioning is known. A rotating drum having a transverse knife edge is typically located upstream of the forming apparatus, and rotates so that its outer surface moves at the same speed as the material to be formed. When the knife edge contacts the material, it scores it perpendicular to its direction of travel, facilitating subsequent sectioning. However, this technique is not feasible with large pieces of sheet steel such as used in forming building panels and corrugated pipe because of the extremely large forces which would be generated when the knife edge struck the sheet material. Moreover, this technique cannot be adapted to helically wound pipe because the sheet stock must be cut at an angle, and this is difficult if not impossible with a rotating drum system.

SUMMARY OF THE INVENTION

The present invention provides a method and apparatus for use in combination with a machine for corrugating a continuous strip of flat sheet material which prepares the sheet material for separation into sections after it has been corrugated. A platform is located upstream of the corrugating machine. The platform is intermittently advanced in the direction of travel and at the speed of the sheet material so that the platform is stationary relative to the sheet material. A scoring device is located on the platform. The scoring device moves across the width of the sheet material as the platform moves with the sheet material to form a spanwise weak point in the material. After the material passes through the corrugating machine, it can readily be separated into sections at the weak points formed in the materials by the scoring device.

When used in the formation of building panels, the present invention eliminates the necessity for a complex and expensive shearing system downstream of the corrugating machine. Because the sheet material has been previously scored, the corrugated material emanating from the corrugating machine can simply be broken off into the desired sections, either by bending the material or providing a transverse stress at the point where the material is scored.

In the present invention, the scoring system may be adjustable so that the material can be scored at an angle by simply rotating the scoring system. As a result, eave sections and other complex panel shapes are readily formed without additional equipment.

In one embodiment of the present invention, the depth of the score is varied across the width of the material so that the material is scored more deeply at the peaks of the corrugated contour than in the valleys. The material will be held together in the shallowly scored valleys as it undergoes the corrugating process, while the deeply scored peaks will easily separate to facilitate sectioning of the material.

Use of the present invention in pipe forming entirely eliminates the necessity for the saw. The system of the present invention readily scores the material on a preselected bias so that a circumferential score is formed in the pipe. The pipe can easily be separated into sections as it emanates from the roll forming device at the end of the corrugating machine by simply bending the pipe. The pipe separates into sections without burrs or sharp edges at its ends, and grinding of the ends is not required.

Implementation of the system of the present invention in pipe forming gives rise to a special problem not found in the prior art. With the present invention, the flat sheet stock is scored prior to the corrugation of the material and prior to rolling of the corrugated material into the shape of a pipe. The edges of the scored sheet stock are typically folded (lapped) to form a Pittsburgh lock seam and the edges of the score form a slight zig-zag configuration. As a result, when the formed pipe is broken into sections, a sharp wedge protrudes at each end of the pipe at the seam. To overcome the problem, the present invention provides punches upstream of the corrugating machine which cut out semicircles from the sheet stock at the ends of the score so that a protruding wedge does not result. The cutouts also facilitate separation of the material when the ends of the score do not line up precisely after the forming process.

The novel features which are characteristic of the invention, as to organization and method of operation, together with further objects and advantages thereof will be better understood from the following description considered in connection with the accompanied drawings which preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a schematic perspective view of the present invention as used in connection with a corrugating machine to form building panels;

FIG. 2 is a schematic perspective view similar to that of FIG. 1 showing the use of the present invention in connection with a corrugating and pipe forming machine to form helically wound corrugated pipe sections;

FIG. 3 is an elevation view of a preferred embodiment of the present invention;

FIG. 4 is a side elevation view of the embodiment of FIG. 3 with certain portions broken away;

FIG. 5 is a top view of the embodiment of FIGS. 3 and 4;

FIG. 6 is an elevation view of the preferred embodiment of the carriage of the present invention;

FIG. 7 is a schematic side sectional view of an alternative embodiment of the present invention in which the depth of scoring varies across the width of the material;

FIG. 8 is a sectional view taken along lines 8—8 of FIG. 7;

FIG. 9 is an elevation view of a score formed by the system of FIGS. 7 and 8 prior to corrugation;

FIG. 10 is a side elevation view of the score formed by the systems of FIGS. 7 and 8 subsequent to corrugation.

FIGS. 11A–11C are fragmentary plan views of the sheet stock used to form helically wound corrugated pipe in its flat configuration, after lapping of the edges, and after formation of the pipe respectively without forming cutouts at the ends of the score;

FIGS. 12A–12C are section views taken along lines 12A, 12B and 12C of FIGS. 11A–11C respectively;

FIGS. 13A–13C are similar to FIGS. 11A–11C with the inclusion of the cutouts of the present invention.

DESCRIPTION OF THE PREFERRED EMBODIMENTS

A schematic view of the apparatus 10 of the present invention as used in the formation of corrugated structural panels is illustrated by way of reference to FIG. 1. A continuous strip 12 of flat sheet material, usually steel, is fed from supply roll 14. Sheet material 12 is fed through a corrugating machine which includes a sequence of corrugating rollers 16–18 which form the material so that it has a two dimensional profile. A continuous strip of corrugated material 20 emanates from the corrugating machine, and is separated into a plurality of discrete building panels 22.

The system of the present invention provides an apparatus 10 located upstream of corrugating rollers 16–18. Apparatus 10 includes a platform 24 which is moveable in the direction of sheet material 12 on rails 26. A frame 28 spans sheet material 12, and is pivotably mounted to platform 24 at a central pivotal support described hereinafter. Frame 28 is movable with respect to platform 24 so that the angular position of frame 28 relative to sheet material 12 is adjustable. A track 32 is mounted to frame 28 and spans sheet material 12. A carriage 34 is moveable along track 32, and a scoring roller 36 is mounted to the carriage.

In operation, platform 24 is intermittently advanced along rails 26 at a speed equal to the speed of sheet material 12 so that the platform is stationary relative to the sheet material. While platform 24 is moving coincident with sheet material 12, carriage 34 is propelled along track 32 from one side of the sheet material to the other. Scoring roller 36 scores the material from one side to the other as the carriage transverses the material, as depicted by dash lines 38. If desired, frame 28 can be rotated so that the score will be at an angle relative to the direction of travel of sheet material 12.

The scored lines 38 in material 12 provide weak points in the material so that the material can easily be separated into sections after it passes through corrugating rollers 16–18. Partial or total separation may also occur during corrugation. One technique for separating the material into sections would be to provide a ram 40 which acts against a support 42 to separate the material at each score 38, and other separating techniques are possible.

The use of the apparatus 10 of the present invention in the formation of helically wound corrugated pipe is illustrated in the schematic view of FIG. 2. A strip 50 of flat sheet material, typically steel, is fed from a roll 52 to a corrugating machine which includes corrugating rollers 54–56. A set of rolls such as 58 bend the corrugated strip 60 emanating from the corrugating machine into a helical configuration, and the edges of the material are welded to form a continuous pipe 62.

Frame 28 is rotated on platform 24 so that scores 64 are formed in the material at an angle to the edge of the material. When the corrugated strip 60 is formed into the continuous pipe 62, scores 64 will provide circumferential scores in the pipe. The free end of the pipe may simply be deflected by a plate 66 to separate the continuous pipe at the score lines 64 to form a plurality of discrete pipe elements 68.

A preferred embodiment of the apparatus 10 of the present invention is illustrated in more detail by reference to FIGS. 3–5 in combination. Rails 26 are mounted to a base 70 which is supported by legs 72. Platform 24 includes bushings 74 which ride on rails 26 so that the platform is moveable in the direction of travel of the strip 12 of sheet material.

A spindle 76 is bolted to the bottom of frame 28. Spindle 76 projects downwardly through platform 24, and is confined by bearings 77, 78 so that frame 28 is pivotable about a fixed vertical axis. Small wheels 79, 80 depend from frame 28 and rest on the upper surface of platform 24.

A transverse track 82 spans frame 28 above the strip 12 of sheet material. Carriage 34 is suspended from track 82 on rollers 83, 84 which ride along ridges 85, 86 on the track. A rod 88 runs along the underside of track 82, and carriage 34 includes a pair of bearings 89, 90 which bear against rod 88 and prevent upward movement of the carriage.

Scoring wheel 36 depends from carriage 34, as will be illustrated in more detail hereinafter. Plate 92 underlies sheet material 12 to provide a support surface for the sheet material during the scoring operation.

Motor 94 is mounted to frame 28, and has an output shaft 96 with a drive pulley 98. Drive pulley 98 is connected to a larger reduction pulley 100 by belt 102. Reduction pulley 100 is mounted on a shaft 104 containing a chain sprocket 106. Chain 108 is connected at its ends to carriage 34 (see FIG. 3) and circumscribes sprocket 106 and a corresponding sprocket 110 at the opposite side of frame 28 (FIG. 5) together with other idler sprockets not shown. Chain 108 provides a positive drive system for carriage 34 so that it can be propelled back and forth across sheet material 12.

Parallel beams 111, 112 span sheet material 12 above and below the sheet material. Bottom beam 112 is fastened to frame 28, and top beam 111 is connected to actuators 114 so that it is moveable in a vertical direction. When a score is to be formed in sheet material 12, actuators 114 clamp beams 111, 112 together with sheet material 12 therebetween, attaching apparatus 12 to the sheet material. Accordingly, platform 24 is propelled along rails 26 at the speed of the sheet material so that the platform is stationary relative to the material as the scoring is accomplished. After the scoring has been finished, actuators 114 are released and a spring loaded take-up reel 116 draws platform 24 back along rails 26 to place it in position for the next cycle.

The angular position of frame 28 can be fixed by locating a peg from the frame into one of a plurality of apertures 118 on circular support 30. In addition, the system can be automated to rotate frame 24 to preselected discrete angular positions using actuator 120. Actuator 120 may be useful in cutting of building panels in which one end of the panel is to be square, while the other end is cut at an angle to accommodate an eave section or for some other purpose.

The preferred embodiment of a carriage 34 of the present invention is illustrated by way of reference to FIG. 6. Carriage 34 includes a body 122, with legs 123, 124 on which wheels 84, 83 are mounted. Attachment points 125 are provided by body 122 for attachment to drive chain 108 (not shown in FIG. 6).

A yoke 126 is attached at its forward end to carriage body 122 by a pin connector 128, which allows yoke 126 to pivot about a horizontal axis. The trailing end of yoke 126 is mounted by a pin connector 130 to one of a pair of links 131, 132. Link 132 is connected to carriage frame 122 by pin connector 134, and links 131, 132 are connected to one another by pin connector 136.

Links 131, 132 operate on a toggle principle so that a slight pivoting of yoke 126 about connector 128 causes movement of pin connector 136 which is proportionate to but much greater than the trailing end of yoke 126 at pin connector 130. A shaft 138 is connected to pin connector 136, and projects outwardly through an aperture provided in carriage body 122. A coil spring 140 circumscribes shaft 138 and a stop 142 confines spring 140 between the stop and carriage body 122. A nut 144 can be used to adjust the tension on spring 140. Another nut 146 is threadibly engaged with shaft 138 and prevents full expansion of spring 140.

Scoring roller 36 is mounted to yoke 126. As carriage 34 is propelled across the sheet material, scoring roller 36 is forced upwardly, pivoting yoke 126 in a counterclockwise direction (referring to FIG. 6). Such movement of yoke 126 compresses spring 140, which acts to bias scoring roller 36 downwardly. The position of nut 144 is adjusted to control the force of the scoring roller on the sheet material.

An alternate embodiment of the present invention is illustrated by way of reference to FIGS. 7 and 8. In this embodiment, a carriage 200 supports a scoring roller surface 202 on a shaft 204. Shaft 204 includes a pair of cam following rollers 205, 206. Each cam following roller 205, 206 rides along parallel linear cams 207, 208 resting on top of sheet material 12. A biasing mechanism 212 such as a hydraulic cylinder maintains followers 205, 206 in contact with cams 208, 208. Each cam 207, 208 has a contoured upper cam surface so that a contoured groove 210 is formed in sheet material 12, as illustrated in FIG. 9. Alternatively, the biasing mechanism 212 can be controlled in a variable fashion to vary the depth of the score in a preselected fashion even without the use of cams and followers.

The contour of groove 210 is preselected so that the deep part of the groove occurs at the peaks of the corrugated sections, as illustrated in FIG. 10, with the shallow portions of the groove occurring in the valleys. In this fashion, the relatively shallowly scored valleys of the material will tend to keep the material in one piece as it passes through the corrugating operation. The deeply scored peaks are more susceptible to separation during corrugation. After the material has passed through the corrugating process, it can be bent downwardly to readily separate the material into sections.

A fragmentary plan view of sheet material 50 used in the formation of a helically wound corrugated pipe is illustrated in FIG. 11A. As material 50 passes through the apparatus of the present invention, the plurality of transverse scores 64 are formed at an angle to the edge of the material from point A to point B, as previously illustrated in FIG. 2. However, it has been found that when the edges of the material are lapped as part of the pipe forming process, as illustrated in FIGS. 11B and 12B, the score forms a zigzag pattern at its ends. As a result, when material 50 is formed into a pipe configuration with seam 221 formed with a Pittsburgh lock (FIGS. 11C, 12C) and broken off into sections such as 68, a protruding wedge 220 is formed at each edge of each pipe section at the seam.

In order to eliminate the unwanted protruding edge 220, a pair of punches 222, 223 may be located along the edges of sheet material 50, as illustrated in FIG. 13A. Punches 222, 223 are activated to punch semicircular cutouts 224, 225 in material 50 at the opposite ends of score 64. The depth of cutouts 224, 225 is at least equal to the distance to which the edges of material 50 is lapped so that lapping of the material is illustrated in FIG. 13B does not result in a double thickness at the edges of score 64. Accordingly, when the material is formed into a pipe section 68, no protruding wedge exists at seam 221 at the ends of the section.

In operation, the system of the present invention can readily be implemented in an existing production line for helically wound corrugated pipe. In this application, the system of the present invention scores the material prior to corrugating, providing for ready separation of the formed material into separate pipe elements, eliminating the need for a saw. In the formation of building panels, the panels can readily be obtained from a continuous strip of sheet material, and shearing difficulties are eliminated.

While preferred embodiments of the present invention have been illustrated in detail, it is apparent that modifications and adaptations of those embodiments will occur to those skilled in the art. For example, the preferred embodiments disclose scoring procedures in which a continuous groove is formed, but the score need not be continuous. It is to be expressly understood that such modifications and adaptations are within the spirit and scope of the present invention, as set forth in the following claims:

What is claimed is:
1. Apparatus for forming corrugated metal product from a substantially flat metal sheet comprising in combination: a corrugator having a plurality of cooperating sets of first and second corrugating rolls arranged so that the sheet, when passed between the rolls, is longitudinally deformed to define parallel, longitudinally extending, side-by-side corrugations; means for advancing the sheet past the roll sets to thereby longitudinally corrugate the sheet; means for forming a transverse score line in the sheet extending from a first face of the sheet towards a second, opposite face thereof including; a platform movable in the direction of travel of the sheet and positioned proximate the sheet and upstream of the corrugator, means for connecting the platform with the sheet so that the platform moves with the same speed as the sheet; and means located on the platform for scoring the sheet across its width from one edge of the sheet to the other edge thereof as the platform moves with the sheet; and means located downstream of the corrugator for and means located downstream of the corrugator for applying a force acting transversely to the faces of the corrugated plate in the vicinity of a score line; whereby the corrugated metal product is severed from a remainder of the sheet in the form of a length of corrugated plate.

2. Apparatus according to claim 1 wherein the platform includes a track, and wherein the scoring means includes a carriage movable along the track and a scoring roller mounted on the carriage.

3. Apparatus according to claim 1 wherein the scoring means includes means for varying the direction of the scoring relative to the direction of travel of the sheet.

4. Apparatus according to claim 2 wherein the track is pivotably mounted to the platform so as to be pivotable about an axis perpendicular to the sheet so that the angular position of the track relative to the direction of travel of the sheet is variable.

5. Apparatus according to claim 1 including a pair of rails oriented parallel to the direction of travel of the sheet upstream of the corrugator, and wherein the platform slides along the rails so as to be movable in the direction of travel of the sheet.

6. Apparatus according to claim 4 including means for automatically pivoting the track between preselected discrete angular positions.

7. Apparatus according to claim 1 wherein the scoring means includes a scoring roller having a continuous scoring edge.

8. Apparatus according to claim 1 including spring bias means on the carriage for biasing the scoring means against the sheet.

9. Apparatus according to claim 8 wherein the spring bias means includes a toggle linkage to increase the biasing force of the spring bias means.

10. Apparatus according to claim 8 wherein the spring bias means includes means for adjusting the tension of the spring bias means.

11. Apparatus according to claim 1 wherein the scoring means includes means for varying the depth of the score across the width of the sheet.

12. Apparatus according to claim 11 wherein the scoring means includes a linear cam extending parallel to the track, means allowing movement of the scoring means relative to the plane of the sheet, and cam follower means adapted to follow the linear cam to control the movement of the scoring means relative to the plane of the sheet to thereby control the depth of the score.

13. Apparatus according to claim 1 wherein the corrugated plate is defined by alternating corrugation peaks and corrugation troughs interconnected by corrugation sides, and wherein the scoring means includes means for scoring those portions of the sheet to be formed into peaks to a greater depth than those portions of the sheet to be formed into troughs.

14. Apparatus according to claim 1 wherein the carriage includes a yoke having a first end pivotably attached to the carriage so as to be pivotable about an axis parallel to the plane of the sheet, and an opposite second end; wherein the scoring means is attached to the yoke intermediate its first and second ends; and further including a linkage having a first end attached to the carriage, an opposite second end attached to the second end of the yoke, and an interior portion which moves proportionately greater than the second end of the linkage; and bias means connected to the interior portion of the linkage to bias the scoring means against the sheet as the carriage moves with the sheet.

15. Apparatus according to claim 14 wherein the bias means includes a hydraulic actuator and means for controlling the hydraulic actuator to vary the depth of the score line across the width of the sheet.

16. Apparatus according to claim 1 wherein the means for forming the score line comprises a track spanning across the width of the sheet;
a carriage movable along the track;
means for propelling said carriage along the track;
a yoke having a first end pivotably attached to the carriage so as to be pivotable about an axis parallel to the plane of the sheet, and an opposite second end;
a scoring roller attached to the yoke intermediate its first and second ends;
a linkage having a first end attached to the carriage, an opposite second end attached to the second end of the yoke, and an interior portion which moves proportionately greater than the second end of the likage;
a shaft having one end connected to the interior portion of the linkage and extending through an aperture in the carriage;
a coil spring circumscribing the shaft on the side of the aperture opposite the one end of the shaft; and
an adjustable stop located on the shaft and adapted to bias the coil spring against the carriage, the position of said stop being adjustable to control the bias force on the linkage to in turn control the force of the scoring roller against the sheet as the carriage moves along the track.

17. Apparatus according to claim 16 including a stop nut fixed to the shaft between the interior portion of the linkage and the carriage to limit movement of said linkage.

18. Apparatus according to claim 16 including means for forming cutouts in the edges of the material at the ends of the score to eliminate protruding wedges if the material is formed into pipe sections, with a folded seam such as a Pittsburgh lock.

19. Apparatus for forming finite lengths of corrugated pipe from an elongated, relatively long, substantially flat metal sheet, the apparatus comprising: means for storing the sheet; means for longitudinally corrugating the sheet to transform the sheet into corrugated plate having parallel, longitudinally extending, side-by-side corrugations; a device adapted to helically coil the corrugated plate about an axis so that a substantially cylindrical, corrugated pipe issues from the device; scoring means for forming a score line in the sheet extending transversely across the sheet and from one face towards another, opposite face of the sheet, the scoring means including means for orienting the score line relative to the sheet so that it has a substantially circular configuration on the pipe; and cutoff means for applying a force in the vicinity of the circular score line which acts transversely to the pipe axis, whereby the length of pipe is severed from a remainder of corrugated pipe coiled by the device along the circular score line.

20. Apparatus according to claim 19 wherein the score line comprises a linear line, and including means for varying the angular orientation of the line with respect to the direction in which the sheet is advanced into the corrugator.

21. Apparatus for use in combination with a machine for helically winding a strip of flat metal sheet into a substantially cylindrical pipe which prepares the sheet for separation into sections after it has been formed into a pipe, the apparatus comprising:
a platform proximate the sheet upstream of the corrugating machine, the platform being movable in the direction of travel of the sheet;
means for intermittently advancing the platform in the direction of travel of and at substantially the same speed as the sheet so that the platform is stationary relative to the sheet;
means located on the platform for scoring the sheet across its width from one edge of the material to the other edge as the platform moves with the sheet to form a weak point in the sheet; and
means for forming cutouts in the edges of the sheet at the score so that protruding wedges are not formed at the end of the pipe section when the edges of the material are lapped in the formation of the material into the pipe and broken into sections.

22. Apparatus according to claim 21 including means for separating the pipe at the score.

23. Apparatus according to claim 22 wherein said separating means includes means for applying a transverse force to the pipe at the score.

24. Apparatus according to claim 23 wherein the separating means includes means for bending the pipe remote from the score to separate a length of pipe at the score from a remainder of the pipe.

25. Apparatus for forming corrugated metal product from a substantially flat metal sheet comprising in combination: a corrugator having a plurality of cooperating sets of first and second corrugating rolls arranged so that the sheet, when passed between the rolls, is longitudinally deformed to define parallel, longitudinally extending side-by-side corrugations; means for advancing the sheet past the roll sets to thereby longitudinally corrugate the sheet; means for forming a transverse score line in the sheet extending from a first face of the sheet towards a second, opposite face thereof including a platform including a track movable in the direction of travel of the sheet and positioned proximate the sheet and upstream of the corrugator; means located on the platform for scoring the sheet across its width from one edge of the sheet to the other edge thereof as the platform moves with the sheet; the scoring means including a carriage movable along the track and a scoring tool mounted on the carriage, a linear cam extending parallel to the track, means allowing movement of the scoring means relative to the plane of the sheet, and cam follower means adapted to follow the linear cam to control the movement of the scoring means relative to the plane of the sheet to thereby vary the depth of the score in accordance with the cam.

26. Apparatus for forming corrugated metal product from a substantially flat metal sheet comprising in combination: a corrugator having a plurality of cooperating sets of first and second corrugating rolls arranged so that the sheet, when passed between the rolls, is longitudinally deformed to define parallel, longitudinally extending, side-by-side corrugations formed by alternating corrugation peaks and corrugation troughs interconnected by corrugation sides; means for advancing the sheet past the roll sets to thereby longitudinally corrugate the sheet; means for forming a transverse score line in the sheet extending from a first face of the sheet towards a second, opposite face thereof and including means for increasing the depth of the score line at those portions of the sheet which are to be formed into and for reducing the depth of the score line at those portions of the sheet which are to be formed into troughs; and means located downstream of the corrugator for applying a force acting transversely to the faces of the corrugated plate in the vicinity of a score line; whereby the corrugated metal product is severed from a remainder of the sheet in the form of a length of corrugated plate.

27. Apparatus for forming corrugated metal product from a substantially flat metal sheet comprising in combination: a corrugator having a plurality of cooperating sets of first and second corrugating rolls arranged so that the sheet, when passed between the rolls, is longitudinally deformed to define parallel, longitudinally extending side-by-side corrugations; means for advancing the sheet past the roll sets to thereby longitudinally corrugate the sheet; means for forming a transverse score line in the sheet extending from a first face of the sheet towards a second, opposite face thereof including a platform movable in the direction of travel of the sheet and positioned proximate the sheet and upstream of the corrugator; means located on the platform for scoring the sheet across its width from one edge of the sheet to the other edge thereof as the platform moves with the sheet; the platform including a yoke having a first end pivotably attached to the platform so as to be pivotable about an axis parallel to the plane of the sheet, and an opposite second end; the scoring means being attached to the yoke intermediate its first and second ends; a linkage having a first end attached to the platform, an opposite second end attached to the second end of the yoke, and an interior portion which moves proportionately greater than the second end of the linkage; bias means connected to the interior portion of the linkage to bias the scoring means against the sheet as the platform moves with the sheet; and means located downstream of the corrugator for applying a force acting transversely to the faces of the corrugated plate in the vicinity of a score line; whereby the corrugated metal product is severed from a remainder of the sheet in the form of a length of corrugated plate.

28. Apparatus according to claim 27 wherein the bias means includes a hydraulic actuator and means for controlling the hydraulic actuator to vary the depth of the score line across the width of the sheet.

29. Apparatus for forming corrugated metal product from a substantially flat metal sheet comprising in combination: a corrugator having a plurality of cooperating sets of first and second corrugating rolls arranged so that the sheet, when passed between the rolls, is longitudinally deformed to define parallel, longitudinally extending, side-by-side corrugations; means for advancing the sheet past the roll sets to thereby longitudinally corrugate the sheet; means for forming a transverse score line in the sheet extending from a first face of the sheet towards a second, opposite face thereof including a track spanning across the width of the sheet, a carriage movable along the track, means for propelling said carriage along the track, a yoke having a first end pivotably attached to the carriage so as to be pivotable about an axis parallel to the plane of the sheet, and an opposite second end, a scoring roller attached to the yoke intermediate its first and second ends, a linkage having a first end attached to the carriage, an opposite second end attached to the second end of the yoke, and an interior portion which moves proportionately greater than the second end of the linkage, a shaft having one end connected to the interior portion of the linkage and extending through an aperture in the carriage, a coil spring circumscribing the shaft on the side of the aperture opposite the one end of the shaft, and an adjustable stop located on the shaft and adapted to bias the coil spring against the carriage, the position of said stop being adjustable to control the bias force on the linkage to in turn control the force of the scoring roller against the sheet as the carriage moves along the tract; and means located downstream of the corrugator for applying a force acting transversely to the faces of the corrugated plate in the vicinity of a score line; whereby the corrugated metal product is severed from a remainder of the sheet in the form of a length of corrugated plate.

* * * * *